Patented July 15, 1952

2,603,111

UNITED STATES PATENT OFFICE 2,603,111

GEAR DEVICE FOR MOTORCARS

Jens Madsen, Valby, Denmark

Application June 17, 1948, Serial No. 33,477
In Denmark June 24, 1947

1 Claim. (Cl. 74—761)

Gear devices are known, in which the movement of the toothed wheel of the gear is guided by some liquid pumps, which are interconnected through pipe lines and attached to a cup-shaped disc having internal teeth.

The present invention, which relates to a gear device for motorcars of this description, is a further development of the principle of the device.

The outstanding feature of the invention is that around the hub of the cup-shaped disc is arranged movably, but not rotatably, a bush, around which a bearing, which is connected with the liquid pumps, is rotatably arranged, and toothed wheels, fixed on a shaft, which is rotatably mounted on a disc attached to the propeller shaft of the motor car, are in mesh with the inside toothed system of the cup-shaped disc, while at the other end of the shaft a toothed wheel is fixed, which is in mesh with a toothed wheel which is running loose around the propeller shaft and is provided with a long hub, around which bushes are movably, but not rotatably arranged, guiding separately by shifting the movement of each its set of liquid pumps. The bushes have circular cross-section and a longitudinal base, slanting in relation to the axis of the bush.

Figure 1:
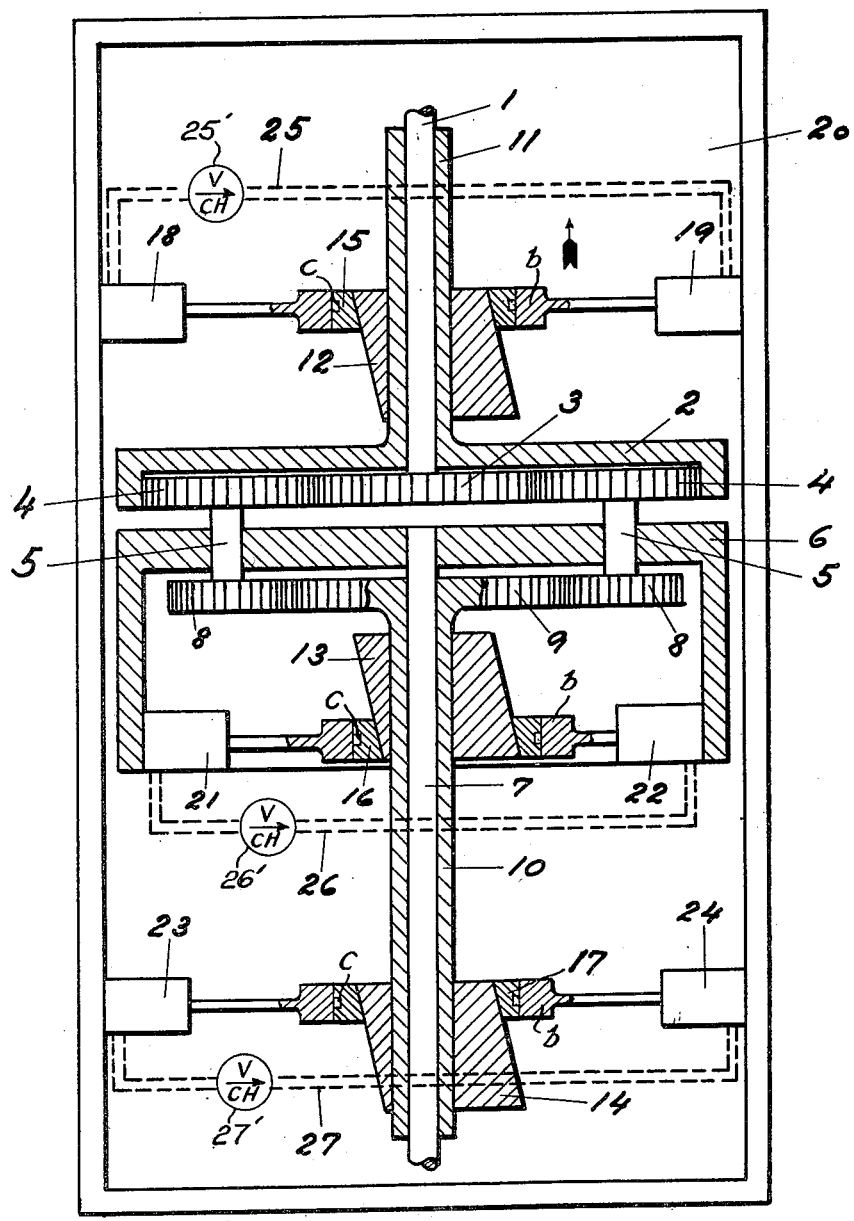

In Figure 1 is shown a gear box with a device according to the invention in top view and partly cut through.

Figure 2:
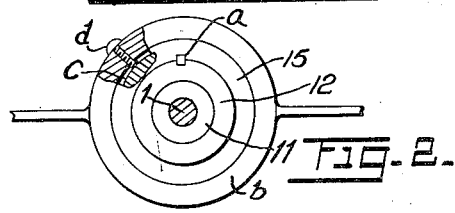

In Figure 2 is shown a horizontal partial section view through any one of the three eccentric bush mountings shown in Figure 1.

1 is the drive shaft of the motor, around which a cup-shaped disc 2 with a gear rim having internal teeth is running loose. To the shaft 1 is attached a toothed wheel 3, which is in mesh with two toothed wheels or gears 4, either of which is in mesh with the internal teeth of the disc 2. The toothed wheels 4 are each attached to its shaft 5, which is rotatably mounted in bearings of a disc 6, which is attached to the drive shaft 7 of the motor car. At the other end of each of the shafts 5 is attached a toothed wheel 8, which is in mesh with a toothed wheel 9 provided with a long hub or sleeve 10, which is running loose around the shaft 7. The disc 2 is provided with a long hub or sleeve 11. A bush 12 is slidably or movably, but not rotatably arranged on the hub 11 in ring or bearing 15. On the hub 10 are, likewise, movably, but not rotatably, arranged bushes 13 and 14. The bushes 12, 13 and 14 have circular cross-section, but in the longitudinal direction they have a slanting aperture, so that the bushes are in one end concentric with hubs 11 and 10 on which they are attached, whereas in the other end the bush is eccentric with the hubs. Around the bushes are arranged annular bearings 15, 16 and 17, respectively. To the bearing 15 are operatively connected the piston rods of two pumps 18 and 19, which are fixed to the walls of the gear box 20. To the bearing 16 are connected the piston rods of two pumps 21 and 22, which are fixed to the disc 6. To the bearing 17 are connected the piston rods of two pumps 23 and 24, which are fixed to the walls of the gear box 20. The pumps 18 and 19 are interconnected by means of a pipe 25. The pumps 21 and 22 are interconnected by means of a pipe 26. The pumps 23 and 24 are interconnected by means of a pipe 27. In each of the three pipes a non-return valve 25′, 26′ and 27′, respectively, is provided which can be opened by means of devices which are not shown in the drawing. The bushes 12, 13 and 14 can be moved, so that each set of the pumps can be put into or out of operation. Actual rotation of the eccentrics, as for example eccentric 12 is prevented by a key entering a corresponding keyway provided in the outer peripheral surface of this eccentric 12 and extending along the entire length thereof. About ring or annular bearing 15 is movably disposed ring b to which the piston rods of the two pumps are connected. Ring b is prevented from sliding along ring 15 in the axial direction by groove c cut in the cylindrical surface of ring 15, and into which a screw d projects from a hole in ring b in which said screw is mounted. Similar details are of course, associated with eccentrics 13 and 14.

On the other hand, pipe lines 25, 26, and 27 serve to enable pumps 18, 21 and 23 to pump oil from a supply tank, not shown, to active pumps 19, 22 and 24. The three bushings 12, 14 and 13 are operatively connected in such manner that whenever one of them is moved into operative eccentric position, the other two are moved into inoperative position concentric with the shaft and sleeve on which they are mounted.

In the drawings the bushes 12 and 14 are shown in such a position that the pumps 18, 19 and 23, 24 are inactive, the bearings 15 and 17 being concentric with the shaft 1 and the shaft 7 respectively, whereas the bush 13 is shown in such a position that the pumps 21 and 22 are operating, the bearing 16 being eccentric with the shaft 7.

By starting low gear is obtained by moving the bush 12 in the direction of the arrow, by which the bearing 15 is brought into an eccentric position to the shaft 1, and the pumps 18 and 19 are brought into operation, while valve 25′ is in a position permitting flow of fluid only from pump 18 to pump 19. Pump 18 pumps oil into the pump 19, which is thereby filled with oil and will hinder the movement of the piston. Thereby the disc 2 is being prevented from rotating. By the revolving of the shaft 1 the toothed wheel 3 will then revolve the toothed wheels 4, so that they will start running on the gear rim of the disc 2, by which the shafts 5 together with the disc 6 will be rotated round the axis of the shaft 1.

When after the starting it is desired to change over to high gear, this is effected by moving the bush 13 to the position shown in the drawing while simultaneously bushing 12 is returned to its inoperative concentric position. Bushing 13 in eccentric operative position causes pump 21 to pump oil into the pump 22, so that the latter is filled and will prevent its piston from moving. When this is done, the bush 13 can no longer be rotated in the bearing 16, but this bearing will act, as if it were fixed to the bush 13 and the toothed wheel 9, and, the disc 6 being fixed to the pumps 21 and 22, this will mean that the toothed wheel 9 is in firm connection with the disc 6. Thereby the toothed wheels 8 are prevented from rotating round their axis, and the rotation of the toothed wheels 4 will also cease, which whereby the disc 2 acts, as if it were fixed to the shaft 1, so that it is rotated together with this shaft, and the disc 6 being, as described above, connected through the shafts 5 to the disc 2, the shaft 7 will be rotated together with and with the same speed as the shaft 1.

When the motor car is stopped, the operator can change over to reverse gear by moving the bush 14, so that the pumps 23 and 24 are brought into operation, by which the bearing 17 is prevented from rotating round the bush 14. By this the hub 10 is fixed, and the toothed wheel 9 is stagnant. The toothed wheels 8 will thereby roll on the toothed wheel 9 and rotate the disc 6 in the opposite direction of its direction of rotation at low gear.

I claim:

A gear transmission, comprising in combination, a fluid supply; a gear box; a drive shaft extending rotatably into said gear box from one side thereof; a driven shaft extending rotatably into said gear box from the opposite side thereof coaxially with said drive shaft; an internal gear having a sleeve-shaped hub rotatably mounted on one end of said drive shaft; a main gear fixedly mounted on said end of said drive shaft within said internal gear; a cup-shaped disc member having a cylindrical wall portion coaxial with said driven shaft being fixedly mounted on the end of said driven shaft opposite said internal gear and having at least one bearing hole substantially parallel to said driven shaft; a pinion shaft rotatably mounted in said bearing hole in said disc member; at least one pinion arranged within said internal gear fixedly mounted on one end of said pinion shaft and meshing with said main gear and with said internal gear; a second gear having a sleeve-shaped hub rotatably mounted on said driven shaft; at least one further pinion fixedly mounted on the other end of said pinion shaft and meshing with said second gear; a first pump connected to said fluid supply fixedly mounted on a wall of said gear box and having a piston rod extending inwardly in one direction towards said drive shaft; a second pump fixedly mounted on an opposite wall of said gear box and having a piston rod extending inwardly in an opposite direction towards said drive shaft; first manually adjustable conduit means interconnecting said first and said second pump permitting in one position flow of fluid only in the direction from said first pump to said second pump while permitting in another position free flow of fluid between the same; a first annular bearing rigidly secured to the ends of said inwardly extending piston rods of said first and second pumps; a first annular member mounted rotatably but not slidably in said annular bearing; a first bushing mounted on said sleeve-shaped hub of said internal gear within said annular member non-rotatably but slidably, and being shaped in such manner as to have one end centered on said sleeve-shaped hub of said internal gear and the other end eccentric thereto so that in one position of said first bushing said annular member is concentric to said drive shaft while in another position of said first bushing with said eccentric end within said annular member said annular member is eccentric relative to said drive shaft and imparts a reciprocating motion to said piston rods; a third pump connected to said fluid supply fixedly mounted on the inner face of said cylindrical wall portion of said disc member and having a piston rod extending inwardly in one direction toward said driven shaft; a fourth pump fixedly mounted on the inner face of an opposite wall portion of said disc member and having a piston rod extending inwardly in an opposite direction towards said driven shaft; second manually adjustable conduit means interconnecting said third and said fourth pump permitting in one position flow of fluid only in the direction from said third pump to said fourth pump while permitting in another position free flow of fluid between the same; a second annular bearing rigidly secured to the ends of said inwardly extending piston rods of said third and fourth pumps; a second annular member mounted rotatably but not slidably in said second annular bearing; a second bushing mounted on said sleeve-shaped hub of said second gear within said second annular member non-rotatably but slidably, and being shaped in such manner as to have one end centered on said sleeve-shaped hub of said second gear and the other end eccentric thereto; a fifth pump connected to said fluid supply fixedly mounted on one wall of said gear box and having a piston rod extending inwardly in one direction towards said driven shaft; a sixth pump fixedly mounted on an opposite wall of said gear box and having a piston rod extending inwardly in an opposite direction towards said driven shaft; third manually adjustable conduit means interconnecting said fifth and said sixth pumps permitting in one position flow of fluid only in the direction from said fifth pump to said sixth pump while in another position permitting free flow of fluid between the same; a third annular bearing rigidly secured to the ends of said inwardly extending piston rods of said fifth and sixth pumps; a third annular member mounted rotatably but not slidably in said third annular bearing; a third bushing mounted on said sleeve-shaped hub of said second gear within said third annular member nonrotatably but slidably and being shaped in such manner as to have one end centered on said sleeve-shaped hub of said second gear and the other end eccentric thereto; and means for slidably moving said bushings on said sleeves operatively interconnected in such manner that whenever one of said three bushings is in operative eccentric position the other two of said three bushings are in inoperative centered position.

JENS MADSEN.

REFERENCES CITED

The following references are of record in the file of this patent:

UNITED STATES PATENTS

| Number | Name | Date |
| --- | --- | --- |
| 1,078,042 | Ford | Nov. 11, 1913 |
| 2,069,023 | Szekely | Jan. 26, 1937 |